United States Patent Office 3,210,150
Patented Oct. 5, 1965

3,210,150
METHOD FOR PREPARING METAL ALUMINUM HYDRIDES
John C. Powers, Jr., Marblehead, Mass., assignor to Ventron Corporation, Beverly, Mass., a company of Massachusetts
No Drawing. Filed Apr. 7, 1960, Ser. No. 20,555
17 Claims. (Cl. 23—14)

This invention relates to a method for preparing metal aluminum hydrides having the formula $M(AlH_4)_x$ where M is an alkali metal or alkaline earth metal and $x$ is the valence of the metal. More particularly, the invention relates to a method for preparing sodium aluminum hydride.

The patent to H. I. Schlesinger and A. E. Finholt, No. 2,567,972, dated September 18, 1951, describes a method for preparing a metal aluminum hydride having the above formula. This method comprises reacting a hydride of an alkali metal or alkaline earth metal with an aluminum halide in an ether reaction medium. The reaction is illustrated by the equation:

$$4LiH + AlCl_3 \rightarrow LiAlH_4 + 3LiCl$$

Lithium aluminum hydride of high purity has been prepared in high yield commercially for several years by this method. However, the method has not been found satisfactory for the preparation of sodium aluminum hydride and other metal aluminum hydrides.

I have discovered a method whereby sodium aluminum hydride and other alkali metal and alkaline earth metal aluminum hydrides having the formula $M(AlH_4)_x$ can be synthesized directly from the elements. In accordance with the invention an alkali metal, such as sodium, lithium or potassium, or an alkaline earth metal, such as calcium or magnesium, or the hydride of an alkali or alkaline earth metal, is heated at an elevated temperature in a confined reaction zone with finely divided aluminum metal and a catalytic amount of a reaction promoter in an inert liquid carrier in the presence of hydrogen under superatmospheric pressure while agitating the mixture until reaction between the aluminum, hydrogen and the alkali metal or alkaline earth metal or hydride thereof is complete. I have found a temperature between about 100° C. and 200° C. and a hydrogen pressure between about 2500 and 5000 p.s.i. to be suitable. A higher pressure may be used but is not necessary.

Suitable reaction promoters for use in the practice of the invention are complex hydrides having the formula $M(AlH_4)_x$ where M is an alkali metal or alkaline earth metal and $x$ is the valence of the metal. Illustrative of such complex hydrides are sodium aluminum hydride, lithium aluminum hydride, calcium aluminum hydride, etc. The amount of such reaction promoter used may vary from about 0.1 to 25.0 percent or more by weight based upon the weight of alkali metal or alkaline earth metal reactant initially in the reaction mixture.

Suitable inert liquid carriers are saturated liquid hydrocarbons, such as hexane, octane, ligroin and cyclohexane; the lower alkyl ethers, such as dimethyl ether, diethyl ether, diisopropyl ether and dibutyl ether; and ethers such as tetrahydrofuran, dioxane or the dimethyl ether of ethylene glycol. Preferably, the liquid carrier should contain an amount of a solvent for the reaction promoter sufficient to dissolve the same.

The invention is illustrated further by the following specific example.

8 grams of 30 mesh aluminum metal, 7 grams of sodium metal, 1 gram of sodium aluminum hydride and 125 ml. of tetrahydrofuran were charged into a 250 ml. Magne-Dash reactor fitted with a magnetic agitator and suitable heating means. Hydrogen was introduced into the reactor under pressure of about 3500 p.s.i. The reaction mixture then was heated for 16 hours at a temperature of about 150° C. with continuous agitation. 12.7 grams of sodium aluminum hydride was isolated from the reaction mixture having a purity of 88 percent and representing a yield of 71 percent.

I claim:
1. The method for preparing a metal aluminum hydride having the formula $M(AlH_4)_x$ where M is a metal selected from the group consisting of alkali metals and alkaline earth metals and $x$ is the valence of the selected metal which comprises heating in a confined reaction zone a material selected from the group consisting of alkali metals, alkaline earth metals and hydrides of such metals with finely divided aluminum metal and a complex hydride having the formula $M(AlH_4)_x$ where M and $x$ have the meanings stated above in an amount from about 0.1 to 25 percent by weight based upon the weight of said selected material used in an inert liquid carrier at a temperature above about 100° C. but below the decomposition temperature of the metal aluminum hydrides in the presence of hydrogen under superatmospheric pressure above about 2500 p.s.i. while agitating the mixture until reaction between said selected material, aluminum and hydrogen is complete.
2. The method as claimed by claim 1 wherein said selected material is sodium metal.
3. The method as claimed by claim 1 wherein said selected material is sodium hydride.
4. The method as claimed by claim 2 wherein said complex hydride is an alkali metal aluminum hydride.
5. The method as claimed by claim 2 wherein said complex hydride is sodium aluminum hydride.
6. The method as claimed by claim 2 wherein said liquid carrier contains a solvent for said complex hydride in an amount sufficient to dissolve the same.
7. The method as claimed by claim 2 wherein said elevated temperature is between 100° C. and 200° C. and said pressure is between about 2500 and 5000 p.s.i.
8. The method as claimed by claim 3 wherein said complex hydride is an alkali metal aluminum hydride.
9. The method as claimed by claim 3 wherein said complex hydride is sodium aluminum hydride.
10. The method as claimed by claim 3 wherein said liquid carrier contains a solvent for said complex hydride in an amount sufficient to dissolve the same.
11. The method as claimed by claim 3 wherein said elevated temperature is between 100° C. and 200° C. and said pressure is between about 2500 and 5000 p.s.i.
12. The method as claimed by claim 4 wherein said liquid carrier contains a solvent for said complex hydride in an amount sufficient to dissolve the same.
13. The method as claimed by claim 8 wherein said liquid carrier contains a solvent for said complex hydride in an amount sufficient to dissolve the same.
14. The method as claimed by claim 12 wherein said elevated temperature is between 100° C. and 200° C. and said pressure is between about 2500 and 5000 p.s.i.
15. The method as claimed by claim 13 wherein said elevated temperature is between 100° C. and 200° C. and said pressure is between about 2500 and 5000 p.s.i.

16. The method as claimed by claim 14 wherein said complex hydride is sodium aluminum hydride.

17. The method as claimed by claim 15 wherein said complex hydride is sodium aluminum hydride.

References Cited by the Examiner

UNITED STATES PATENTS

| | | | |
|---|---|---|---|
| 2,372,671 | 4/45 | Hansley | 23—204 |
| 2,567,972 | 9/51 | Schlesinger et al. | 23—14 |
| 2,729,540 | 1/56 | Fisher | 23—14 |
| 2,900,224 | 8/59 | Hinckley et al. | 23—14 |
| 2,900,402 | 8/59 | Johnson | 260—448 |
| 2,920,935 | 1/60 | Finholt | 23—14 |
| 2,992,248 | 7/61 | Pearson | 23—14 X |

OTHER REFERENCES

Schwab et al.: Zeitung für Naturforschung, vol. 8b, 1953, pp. 690–691.

MAURICE A. BRINDISI, *Primary Examiner*.

GEORGE D. MITCHELL, *Examiner*.